(12) United States Patent
Mahmoud et al.

(10) Patent No.: US 12,083,603 B1
(45) Date of Patent: Sep. 10, 2024

(54) GREEN-SYNTHESIS OF COPPER NANOPARTICLES-PVDF HYBRID FOR WATER DISINFECTION

(71) Applicant: KING FAISAL UNIVERSITY, Al-Ahsa (SA)

(72) Inventors: Mohamed Gouda Mahmoud, Al-Ahsa (SA); Hany Mohamed Abd El-Lateef Ahmed, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/511,975

(22) Filed: Nov. 16, 2023

(51) Int. Cl.
| | |
|---|---|
| *B22F 9/24* | (2006.01) |
| *B22F 1/0545* | (2022.01) |
| *C02F 1/00* | (2023.01) |
| *C08J 3/14* | (2006.01) |
| *B82Y 30/00* | (2011.01) |
| *B82Y 40/00* | (2011.01) |

(52) U.S. Cl.
CPC ............. *B22F 9/24* (2013.01); *B22F 1/0545* (2022.01); *C02F 1/001* (2013.01); *C08J 3/14* (2013.01); *B22F 2202/17* (2013.01); *B22F 2301/10* (2013.01); *B22F 2303/01* (2013.01); *B82Y 30/00* (2013.01); *B82Y 40/00* (2013.01); *C02F 2303/04* (2013.01); *C02F 2305/08* (2013.01); *C08J 2327/16* (2013.01)

(58) Field of Classification Search
None
See application file for complete search history.

(56) References Cited

U.S. PATENT DOCUMENTS

2010/0200501 A1   8/2010   Hoag et al.
2020/0173076 A1*  6/2020   Cataldo ............ G01N 33/54388

FOREIGN PATENT DOCUMENTS

CN   107243647 A      10/2017
CN   114892300 A  *   8/2022

OTHER PUBLICATIONS

English translation of CN 114892300 (originally published Aug. 12, 2022), obtained from PE2E search.*
Wang et al., "Green Synthesis of Copper Nanoparticles Using Green Coffee Bean and Their Applications for Efficient Reduction of Organic Dyes", Journal of Environmental Chemical Engineering, vol. 9, Issue 4, Aug. 2021, 105331.
Dhand et al., "Green Synthesis of Silver Nanoparticles Using Coffea Arabica Seed Extract and Its Antibacterial Activity", Materials Science and Engineering: C, vol. 58, Jan. 1, 2016, pp. 36-43.
Ibrahim et al., "Green Preparation of Cu Nanoparticles of the Avocado Seed Extract as an Adsorbent Surface", Materials Science for Energy Technologies, vol. 6, 2023, pp. 130-136.

* cited by examiner

*Primary Examiner* — George Wyszomierski
(74) *Attorney, Agent, or Firm* — Nath, Goldberg & Meyer; Joshua B. Goldberg

(57) ABSTRACT

Methods of making polyvinylidene fluoride nanoparticles fine powder (PVDFNPs) and copper nanoparticles (CUNPs) from spent green coffee grounds extract. Using the formed PVDFNPs and CUNPs to produce copper nanoparticles-polyvinylidene fluoride nanoparticles nanocomposite fine powder (CuNPs@PVDFNPs) for eliminating pathogenic contaminants (i.e., *Salmonella enterica, Klebsiella pneumoniae, Bacillus subtilis, Enterococcus faecalis*) from an aqueous solution (i.e., wastewater).

17 Claims, 12 Drawing Sheets

GREEN-SYNTHESIS OF COPPER NANOPARTICLES-PVDF HYBRID FOR WATER DISINFECTION

FIELD AND BACKGROUND

The disclosure of the present application relates to a method of making a copper nanoparticles-polyvinylidene fluoride nanoparticles nanocomposite fine powder (CuNPs@PVDFNPs) for eliminating pathogenic contaminants from an aqueous solution.

DESCRIPTION OF THE PRIOR ART

Water covers about 71% of the Earth's surface. It is essential for the existence of all forms of life. Humans, microbes, plants, trees, and aquatic animals depend on water to survive. Without water, all living organisms will fail to exist. In the context of humans, we need freshwater to not only survive, but also to prevent illness and diseases caused by polluted water.

Water also plays an important role in the world economy. It is a critical resource for agricultural production and plays an important role in global food security. Water is also a fundamental commodity, used by many industries, for almost every step of manufacturing and production processes around the world. Most industries need freshwater to some degree for their manufacturing processes. Agriculture industry needs freshwater to provide for crop production.

However, freshwater water availability is becoming scarcer in the past decades. The availability of freshwater is greatly impacted by climate change, overpopulation of humankind, urbanization, and pollution. In the context of pollution, pathogens are major a major threat to freshwater availability. Various pathogens can contribute to water contamination. They are usually found in abundance in wastewater. Those pathogens can include *Salmonella enterica, Klebsiella pneumoniae, Bacillus subtilis*, and *Enterococcus faecalis*. *Salmonella enterica* is a major cause of gastroenteritis, causing approximately 94 million infections and about 155,000 deaths annually worldwide. *Klebsiella pneumoniae* can lead to a range of illness including pneumonia, bloodstream infections, meningitis, and urinary tract infects. *Bacillus subtilis* can cause bacteremia, endocarditis, pneumonia, and septicemia. *Enterococcus faecalis* can cause UTIs, bacteremia, IE, meningitis, intra-abdominal infections, and wound infections.

In light of the above, a need remains for an efficient, cost-effective, and environmentally friendly method for a making copper nanoparticles-polyvinylidene fluoride nanoparticles nanocomposite fine powder for eliminating pathogenic contaminants (i.e., bacteria) from an aqueous solution (i.e., wastewater).

SUMMARY

The present subject matter relates to methods of making a polyvinylidene fluoride nanoparticles fine powder (PVDFNPs) and copper nanoparticles (CUNPs) from spent green coffee grounds extract. The present subject matter further relates to using the formed PVDFNPs and CUNPs to produce a copper nanoparticles-polyvinylidene fluoride nanoparticles nanocomposite fine powder (CuNPs@PVDFNPs), which, in some embodiments, can be used for eliminating pathogenic contaminants (i.e., *Salmonella enterica, Klebsiella pneumoniae, Bacillus subtilis, Enterococcus faecalis*) from an aqueous solution (i.e., wastewater).

In one embodiment, the method of making copper nanoparticles (CUNPs) from spent green coffee grounds extract (SGCGs) can include obtaining spent green coffee grounds; weighing and washing the spent green coffee grounds to form washed spent green coffee grounds; heating the washed spent green coffee grounds to obtain dried spent green coffee grounds; grinding the dried spent green coffee grounds to obtain spent green coffee grounds powder; sieving the spent green coffee grounds powder; adding water to the sieved spent green coffee grounds powder to obtain a mixture; boiling the mixture for about 3 hours; cooling the boiled mixture; centrifuging the cooled mixture at about room temperature to form a centrifuged mixture; filtering the centrifuged mixture to obtain spent green coffee grounds extract; adding water to the spent green coffee grounds extract to obtain a spent green coffee grounds extract solution; stirring while heating the spent green coffee grounds extract solution; adding copper sulfate hexahydrate and ascorbic acid to the heated spent green coffee grounds extract solution to obtain copper nanoparticles solution; continuously stirring and heating the copper nanoparticles solution at about 80° C. for about 10 hours; separating the copper nanoparticles from the heated copper nanoparticles solution via centrifugation to obtain filtered copper nanoparticles; and drying the filtered copper nanoparticles to obtain dried copper nanoparticles (CUNPs).

In a further embodiment, the present subject matter relates to copper nanoparticles (CUNPs) from spent green coffee grounds extract prepared by the above method.

In an embodiment, the spent green coffee grounds extract solution can be magnetically stirred at about 80° C. for about 1 hour.

In an embodiment, the copper nanoparticles solution can be prepared by adding dropwise about 100 mL of the copper sulfate hexahydrate and about 0.01 g of the ascorbic acid to the heated spent green coffee grounds extract solution.

In another embodiment, the filtered copper nanoparticles can be prepared by centrifuging the heated copper nanoparticles solution at a speed of about 1000 rpm for about 10 minutes.

In another embodiment, the dried copper nanoparticles can be prepared by drying the filtered copper nanoparticles in a hot air oven for about 5 hours.

In a further embodiment, the present subject matter relates to a method of making polyvinylidene fluoride nanoparticles fine powder (PVDFNPs), the method including dissolving polyvinylidene fluoride in dimethyl acetamide (DMAc) to obtain a polyvinylidene fluoride solution; vigorously stirring the polyvinylidene fluoride solution; adding Tween 80 to the polyvinylidene fluoride solution to obtain a solution mixture and stirring the solution mixture to obtain dispersed polyvinylidene fluoride nanoparticles in the solution mixture; separating the dispersed polyvinylidene fluoride nanoparticles from the solution mixture via centrifugation to obtain centrifuged polyvinylidene fluoride nanoparticles; freeze-drying the centrifuged polyvinylidene fluoride nanoparticles to obtain freeze-dried polyvinylidene fluoride nanoparticles fine powder (PVDFNPs).

In a further embodiment, the present subject matter relates to polyvinylidene fluoride nanoparticles fine powder (PVDFNPs) prepared by the above method.

In an embodiment, the polyvinylidene fluoride solution can be prepared by dissolving the polyvinylidene fluoride in the dimethyl acetamide at a ratio of about 0.5 g of the polyvinylidene fluoride to about 50 mL of the dimethyl acetamide.

In an embodiment, the dispersed polyvinylidene fluoride nanoparticles in the solution mixture can be prepared by adding about 0.2 g of the Tween 80 to the polyvinylidene fluoride solution to obtain the solution mixture and placing the solution mixture in an ice bath, then stirring the solution mixture at about room temperature for about 5 hours using an ultrasonic probe.

In another embodiment, the freeze-dried polyvinylidene fluoride nanoparticles fine powder can be prepared by freeze-drying the centrifuged polyvinylidene fluoride nanoparticles at about −60° C.

In a further embodiment, the present subject matter relates to a method of making copper nanoparticles-polyvinylidene fluoride nanoparticles nanocomposite fine powder (CuNPs@PVDFNPs), the method including obtaining the dried copper nanoparticles (CUNPs) prepared by the above method; dispersing the dried copper nanoparticles in deionized water to obtain a solution mixture and stirring the solution mixture to obtain a copper nanoparticles solution mixture; obtaining the freeze-dried polyvinylidene fluoride nanoparticles fine powder (PVDFNPs) prepared by the above method; preparing a mixture of deionized water and Tween 80 to obtain a solution; dispersing the freeze-dried polyvinylidene fluoride nanoparticles fine powder in the solution to obtain a polyvinylidene fluoride nanoparticles solution; continuously stirring the polyvinylidene fluoride nanoparticles solution while adding the copper nanoparticles solution mixture to the polyvinylidene fluoride nanoparticles solution to obtain a copper nanoparticles-polyvinylidene fluoride nanoparticles nanocomposite solution; and freeze-drying the copper nanoparticles-polyvinylidene fluoride nanoparticles nanocomposite solution to obtain a freeze-dried copper nanoparticles-polyvinylidene fluoride nanoparticles nanocomposite fine powder (CuNPs@PVDFNPs).

In an embodiment, the present subject matter relates to copper nanoparticles-polyvinylidene fluoride nanoparticles nanocomposite fine powder (CuNPs@PVDFNPs) prepared by the above method.

In an embodiment, the copper nanoparticles solution mixture can be prepared by dispersing about 0.25 g of the dried copper nanoparticles in about 10 mL of the deionized water to obtain the solution mixture and stirring the solution mixture for about 2 minutes using a magnetic stirrer.

In another embodiment, the solution can be prepared by adding the deionized water to the Tween 80 at a ratio of about 50 mL of the deionized water to about 0.1 g of the Tween 80.

In another embodiment, the obtained copper nanoparticles-polyvinylidene fluoride nanoparticles nanocomposite solution can include complete homogeneity between the copper nanoparticles and the polyvinylidene fluoride nanoparticles.

In an embodiment, the copper nanoparticles-polyvinylidene fluoride nanoparticles nanocomposite solution can be prepared by continuously stirring the polyvinylidene fluoride nanoparticles solution for about 30 minutes using an ultrasonic probe while adding about 5 mL of the copper nanoparticles solution mixture to the polyvinylidene fluoride nanoparticles solution.

In a further embodiment, the present subject matter relates to a method of eliminating pathogenic contaminants from an aqueous solution, the method includes disinfecting the aqueous solution with the copper nanoparticles-polyvinylidene fluoride nanoparticles nanocomposite fine powder (CuNPs@PVDFNPs) prepared by the above method.

In an embodiment, the aqueous solution can include wastewater.

In a further embodiment, the pathogenic contaminants can be selected from the group consisting of *Salmonella enterica, Klebsiella pneumoniae, Bacillus subtilis, Enterococcus faecalis*, other bacteria, and combination thereof.

These and other features of the present subject matter will become readily apparent upon further review of the following specification.

DETAILED DESCRIPTION

Figure 1C:
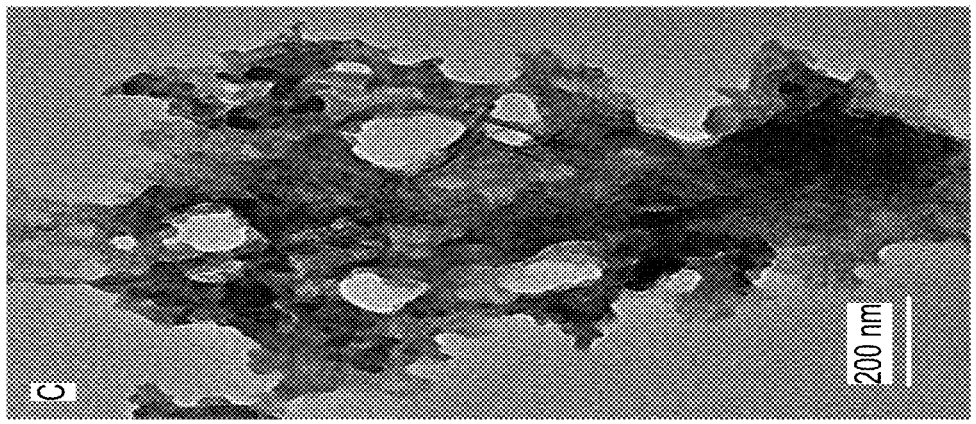
FIGS. 1A-1C depict TEM images of the prepared CuNPs, PVDFNPs, and CuNPs@PVDFNPs.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to methods of making polyvinylidene fluoride nanoparticles fine powder (PVDFNPs) and copper nanoparticles (CUNPs) from spent green coffee grounds extract. The present subject matter further relates to using the formed PVDFNPs and CUNPs to produce copper nanoparticles-polyvinylidene fluoride nanoparticles nanocomposite fine powder (CuNPs@PVDFNPs) for eliminating, for example, pathogenic contaminants (i.e., *Salmonella enterica, Klebsiella pneumoniae, Bacillus subtilis, Enterococcus faecalis*, by way of non-limiting example) from an aqueous solution (i.e., wastewater, by way of non-limiting example).

In one embodiment, the method of making copper nanoparticles (CUNPs) from spent green coffee grounds extract (SGCGs) includes obtaining spent green coffee grounds; weighing and washing the spent green coffee grounds to form washed spent green coffee grounds; heating the washed spent green coffee grounds to obtain dried spent green coffee grounds; grinding the dried spent green coffee grounds to obtain spent green coffee grounds powder; sieving the spent green coffee grounds powder; adding water to the sieved spent green coffee grounds powder to obtain a mixture; boiling the mixture for about 3 hours; cooling the boiled mixture; centrifuging the cooled mixture at about room temperature to form a centrifuged mixture; filtering the centrifuged mixture to obtain spent green coffee grounds extract; adding water to the spent green coffee grounds extract to obtain a spent green coffee grounds extract solution; stirring while heating the spent green coffee grounds extract solution; adding copper sulfate hexahydrate and ascorbic acid to the heated spent green coffee grounds extract solution to obtain copper nanoparticles solution; continuously stirring and heating the copper nanoparticles solution at about 80° C. for about 10 hours; separating the copper nanoparticles from the heated copper nanoparticles solution via centrifugation to obtain filtered copper nanoparticles; and drying the filtered copper nanoparticles to obtain dried copper nanoparticles (CUNPs).

In a further embodiment, the present subject matter relates to copper nanoparticles (CUNPs) from spent green coffee grounds extract prepared by the above method.

In one embodiment, the method can include obtaining spent green coffee grounds, which have been consumed. The spent green coffee grounds can be weighed. The weighed spent green coffee grounds can be washed with deionized water at about room temperature to obtain about a neutral pH. The deionized water can remove impurities from the spent green coffee grounds. In an embodiment, the washed spent green coffee grounds can be dried in an oven at about 50° C. for about 48 hours to achieve constant weight. The dried spent green coffee grounds can be grinded to obtain spent green coffee grounds powder. Afterward, the spent green coffee grounds powder can be sieved through a No. 60 mesh sieve.

In an embodiment, about 10 g of the sieved spent green coffee grounds powder can be added to about 100 mL of distilled water, which was used as the extraction solvent, to obtain a mixture. In an embodiment, the mixture can be boiled for about 3 hours. Afterward, the boiled mixture can be allowed to cool.

In an embodiment, the cooled mixture can be centrifuged at about room temperature for about 15 minutes. Afterward, the centrifuged mixture can be filtered to obtain spent green coffee grounds extract. The filtered spent green coffee grounds extract can be stored at a temperature range of about 5° C. to about 10° C.

In an embodiment, about 10 g of the filtered spent green coffee grounds extract can be added to about 100 mL of distilled water in a conical flask to obtain a spent green coffee grounds extract solution. The spent green coffee grounds extract solution can be magnetically stirred while being heated at about 80° C. for about 1 hour.

In another embodiment, about 100 mL of copper sulfate hexahydrate (0.1M) and about 0.01 g of ascorbic acid can be added dropwise to the heated spent green coffee grounds extract solution to obtain copper nanoparticles solution. The copper nanoparticles solution can be continuously stirred and heated at about 80° C. for about 10 hours. The ascorbic acid can be used to prevent the oxidation of the formed copper nanoparticles. The color of the heated spent green coffee grounds extract solution can be shifted from blue-green to brownish-black, indicating the successful formation of the copper nanoparticles by using the prepared spent green coffee grounds extract.

In an embodiment, the heated copper nanoparticles solution can be centrifuged at a high speed of about 1000 rpm for about 10 minutes to separate the copper nanoparticles from the heated copper nanoparticles solution thereby obtaining filtered copper nanoparticles. In an embodiment, the filtered copper nanoparticles can be dried in a hot air oven for about 5 hours to obtain dried copper nanoparticles (CUNPs).

In a further embodiment, the present subject matter relates to a method of making polyvinylidene fluoride nanoparticles fine powder (PVDFNPs), the method including dissolving polyvinylidene fluoride in dimethyl acetamide (DMAc) to obtain a polyvinylidene fluoride solution; vigorously stirring the polyvinylidene fluoride solution; adding Tween 80 to the polyvinylidene fluoride solution to obtain a solution mixture and stirring the solution mixture to obtain dispersed polyvinylidene fluoride nanoparticles in the solution mixture; separating the dispersed polyvinylidene fluoride nanoparticles from the solution mixture via centrifugation to obtain centrifuged polyvinylidene fluoride nanoparticles; freeze-drying the centrifuged polyvinylidene fluoride nanoparticles to obtain freeze-dried polyvinylidene fluoride nanoparticles fine powder (PVDFNPs).

In an embodiment, the present subject matter relates to polyvinylidene fluoride nanoparticles fine powder (PVDFNPs) prepared by the above method.

In an embodiment, the method can include dissolving about 0.5 g of polyvinylidene fluoride in about 50 mL of dimethyl acetamide (DMAc) to obtain a polyvinylidene fluoride solution. The polyvinylidene fluoride solution can be vigorously stirred at about room temperature.

In an embodiment, about 0.2 g of Tween 80, which is a nonionic surfactant, can be added to the polyvinylidene fluoride solution to obtain a solution mixture. The solution mixture can be placed in an ice bath and the solution mixture can be stirred at about room temperature for about 5 hours using an ultrasonic probe. The addition of the Tween 80 to the polyvinylidene fluoride solution and the stirring can cause polyvinylidene fluoride nanoparticles to be dispersed within the solution mixture. The ice bath can prevent the evaporation of the dimethyl acetamide.

In an embodiment, the solution mixture can be centrifuged at about 10,000 rpm to separate the dispersed polyvinylidene fluoride nanoparticles from the solution mixture to obtain centrifuged polyvinylidene fluoride nanoparticles.

In an embodiment, the centrifuged polyvinylidene fluoride nanoparticles can be freeze-dried at about −60° C. to obtain freeze-dried polyvinylidene fluoride nanoparticles fine powder (PVDFNPs).

In a further embodiment, the present subject matter relates to a method of making copper nanoparticles-polyvinylidene fluoride nanoparticles nanocomposite fine powder (CuNPs@PVDFNPs), the method includes obtaining the dried copper nanoparticles (CUNPs) prepared by the above method; dispersing the dried copper nanoparticles in deionized water to obtain a solution mixture and stirring the solution mixture to obtain a copper nanoparticles solution mixture; obtaining the freeze-dried polyvinylidene fluoride nanoparticles fine powder (PVDFNPs) prepared by the above method; preparing a mixture of deionized water and Tween 80 to obtain a solution; dispersing the freeze-dried polyvinylidene fluoride nanoparticles fine powder in the solution to obtain a polyvinylidene fluoride nanoparticles solution; continuously stirring the polyvinylidene fluoride nanoparticles solution while adding the copper nanoparticles solution mixture to the polyvinylidene fluoride nanoparticles solution to obtain a copper nanoparticles-polyvinylidene fluoride nanoparticles nanocomposite solution; and freeze-drying the copper nanoparticles-polyvinylidene fluoride nanoparticles nanocomposite solution to obtain a freeze-dried copper nanoparticles-polyvinylidene fluoride nanoparticles nanocomposite fine powder (CuNPs@PVDFNPs).

In an embodiment, the present subject matter relates to copper nanoparticles-polyvinylidene fluoride nanoparticles nanocomposite fine powder (CuNPs@PVDFNPs) prepared by the above method.

In an embodiment, the method can include dispersing of about 0.25 g of the dried copper nanoparticles (CUNPs) in about 10 mL of deionized water to obtain a solution mixture and the solution mixture can be magnetically stirred for about 2 minutes to obtain a copper nanoparticles solution mixture. In an embodiment, about 0.1 g of Tween 80, which was used as a dispersing agent, can be added to about 50 mL of deionized water to obtain a solution.

In an embodiment, about 0.25 g of the freeze-dried polyvinylidene fluoride nanoparticles fine powder can be dispersed in the solution to obtain a polyvinylidene fluoride nanoparticles solution.

In an embodiment, the polyvinylidene fluoride nanoparticles solution can be continuously stirred for about 30 minutes using an ultrasonic probe while about 5 mL of the copper nanoparticles solution mixture can be added to the polyvinylidene fluoride nanoparticles solution to obtain a copper nanoparticles-polyvinylidene fluoride nanoparticles nanocomposite solution. The obtained copper nanoparticles-polyvinylidene fluoride nanoparticles nanocomposite solution can have no phase separation which indicated complete homogeneity between the copper nanoparticles and the polyvinylidene fluoride nanoparticles.

In an embodiment, the copper nanoparticles-polyvinylidene fluoride nanoparticles nanocomposite solution can be freeze-dried to obtain a freeze-dried copper nanoparticles-polyvinylidene fluoride nanoparticles nanocomposite fine powder (CuNPs@PVDFNPs).

In a further embodiment, the present subject matter relates to a method of eliminating pathogenic contaminants from an aqueous solution, the method includes disinfecting the aqueous solution with the copper nanoparticles-polyvinylidene fluoride nanoparticles nanocomposite fine powder (CuNPs@PVDFNPs) prepared by the above method.

In an embodiment, the aqueous solution can include wastewater.

In an embodiment, the pathogenic contaminants can be selected from the group consisting of *Salmonella enterica, Klebsiella pneumoniae, Bacillus subtilis, Enterococcus faecalis*, other bacteria, and combination thereof.

Figure 1B:
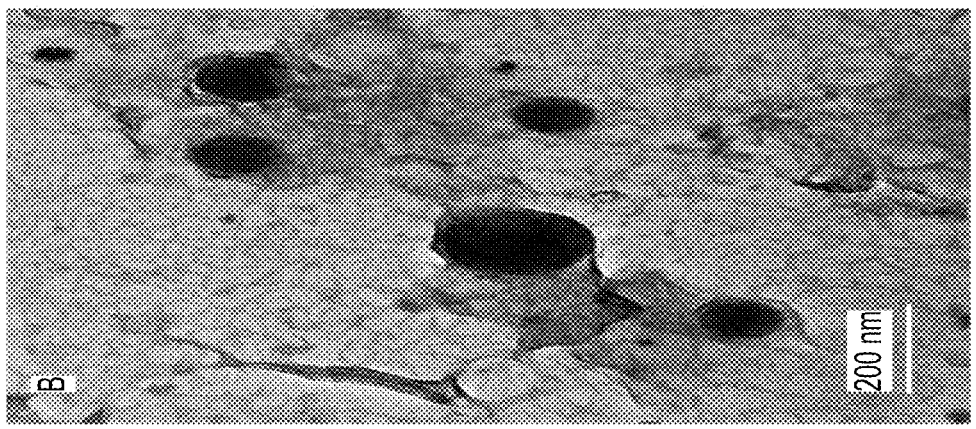
Figure 1A:

FIGS. 1A-1C show TEM images of the CuNPs, PVDFNPs, and CuNPs@PVDFNPs prepared by the above methods. As shown in FIG. 1A, CuNPs, using SGCGs extract, is formed in very small size with spherical shape having a diameter size of about 10 mm to about 15 nm. In FIG. 1B, the prepared PVDFNPs are in nano-size with spherical form without agglomeration. This is due to the presence of the Tween 80 dispersing agent and the ultrasonic stirring. In FIG. 1C, the prepared CuNPs@PVDFNPs have larger agglomerates than the CuNPs and the PVDF. This is due to the fact that the stabilization process has decreased significantly. Nevertheless, it is noticed that these CuNPs@PVDFNPs aggregations are still in nano size with average diameter of about 55 nm to about 60 nm. The following examples illustrate the present teachings.

EXAMPLES

Example 1

Preparation of Spent Green Coffee Grounds Extract (SGCGs)

The process of preparing spent green coffee grounds extract was conducted using the following steps.

Weighing and washing the spent green coffee grounds extract: Spent green coffee grounds, which have been consumed, were collected and weighed. The weighed spent green coffee grounds were washed with deionized water at about room temperature to obtain about a neutral pH. The deionized water removed impurities from the spent green coffee grounds.

Drying of the washed spent green coffee grounds: The washed spent green coffee grounds were dried in an oven at about 50° C. for about 48 hours to achieve constant weight.

Grinding and sieving the dried spent green coffee grounds: The dried spent green coffee grounds were grinded to obtain spent green coffee grounds powder. Afterward, the spent green coffee grounds powder was sieved through a No. 60 mesh sieve.

Adding water to the sieved spent green coffee grounds powder: About 10 g of the sieved spent green coffee grounds powder was added to about 100 mL of distilled water, which was used as the extraction solvent, to obtain a mixture.

Boiling and cooling the mixture: The mixture was boiled for about 3 hours. Afterward, the boiled mixture was allowed to cool.

Centrifuging and filtering the cooled mixture: The cooled mixture was centrifuged at about room temperature for about 15 minutes. Afterward, the centrifuged mixture was filtered to obtain spent green coffee grounds extract.

Storing the spent green coffee grounds extract: The filtered spent green coffee grounds extract was stored at a temperature range of about 5° C. to about 10° C.

Example 2

Synthesis of Copper Nanoparticles (CuNPs) Using the Spent Green Coffee Grounds Extract (SGCGs)

The process of synthesizing copper nanoparticles using the spent green coffee grounds extract was conducted using the following steps.

Adding the spent green coffee grounds extract to distilled water: About 10 g of the filtered spent green coffee grounds extract was added to about 100 mL of distilled water in a conical flask to obtain a spent green coffee grounds extract solution.

Stirring and heating: The spent green coffee grounds extract solution was magnetically stirred while being heated at about 80° C. for about 1 hour.

Adding copper sulfate hexahydrate and ascorbic acid: About 100 mL of copper sulfate hexahydrate (0.1M) and about 0.01 g of ascorbic acid were added dropwise to the heated spent green coffee grounds extract solution to obtain copper nanoparticles solution. The copper nanoparticles solution was continuously stirred and heated at about 80° C. for about 10 hours. The ascorbic acid was used to prevent the oxidation of the formed copper nanoparticles. The color of the heated spent green coffee grounds extract solution shifted from blue-green to brownish-black, indicating the successful formation of the copper nanoparticles by using the prepared spent green coffee grounds extract.

Centrifugation: The heated copper nanoparticles solution was centrifuged at a high speed of about 1000 rpm for about 10 minutes to separate the copper nanoparticles from the heated copper nanoparticles solution thereby obtaining filtered copper nanoparticles.

Drying: The filtered copper nanoparticles were dried in a hot air oven for about 5 hours to obtain dried copper nanoparticles (CUNPs).

Example 3

Preparation of Polyvinylidene Fluoride Nanoparticles Fine Powder (PVDFNPs)

The process of preparing polyvinylidene fluoride nanoparticles fine powder was conducted using the following steps.

Dissolving: About 0.5 g of polyvinylidene fluoride was dissolved in about 50 mL of dimethyl acetamide (DMAc) to obtain a polyvinylidene fluoride solution. The polyvinylidene fluoride solution was vigorously stirred at about room temperature.

Preparation of dispersed polyvinylidene fluoride nanoparticles: About 0.2 g of Tween 80, which is a nonionic surfactant, was added to the polyvinylidene fluoride solution to obtain a solution mixture. The solution mixture was placed in an ice bath and the solution mixture was stirred at about room temperature for about 5 hours using an ultrasonic probe. The addition of the Tween 80 to the polyvinylidene fluoride solution and the stirring caused polyvinylidene fluoride nanoparticles to be dispersed within the solution mixture. Additionally, the ice bath prevented the evaporation of the dimethyl acetamide.

Centrifugation: The solution mixture was centrifuged at about 10,000 rpm to separate the dispersed polyvinylidene fluoride nanoparticles from the solution mixture to obtain centrifuged polyvinylidene fluoride nanoparticles.

Freeze-drying: The centrifuged polyvinylidene fluoride nanoparticles were freeze-dried at about −60° C. to obtain freeze-dried polyvinylidene fluoride nanoparticles fine powder (PVDFNPs).

Example 4

Preparation of Copper Nanoparticles-Polyvinylidene Fluoride Nanoparticles Nanocomposite Fine Powder (CuNPs@PVDFNPs)

The process of preparing copper nanoparticles-polyvinylidene fluoride nanoparticles nanocomposite fine powder was conducted using the following steps.

Preparation of copper nanoparticles solution mixture: About 0.25 g of the dried copper nanoparticles (CUNPs) was dispersed in about 10 mL of deionized water to obtain a solution mixture and the solution mixture was magnetically stirred for about 2 minutes to obtain a copper nanoparticles solution mixture.

Preparation of a solution: About 0.1 g of Tween 80, which was used as a dispersing agent, was added to about 50 mL of deionized water to obtain a solution.

Preparation of a polyvinylidene fluoride nanoparticles solution: About 0.25 g of the freeze-dried polyvinylidene fluoride nanoparticles fine powder was dispersed in the solution to obtain a polyvinylidene fluoride nanoparticles solution.

Preparation of a copper nanoparticles-polyvinylidene fluoride nanoparticles nanocomposite solution: The polyvinylidene fluoride nanoparticles solution was continuously stirred for about 30 minutes using an ultrasonic probe while about 5 mL of the copper nanoparticles solution mixture was added to the polyvinylidene fluoride nanoparticles solution to obtain a copper nanoparticles-polyvinylidene fluoride nanoparticles nanocomposite solution. The obtained copper nanoparticles-polyvinylidene fluoride nanoparticles nanocomposite solution had no phase separation which indicated complete homogeneity between the copper nanoparticles and the polyvinylidene fluoride nanoparticles.

Freeze-drying: The copper nanoparticles-polyvinylidene fluoride nanoparticles nanocomposite solution was freeze-dried to obtain a freeze-dried copper nanoparticles-polyvinylidene fluoride nanoparticles nanocomposite fine powder (CuNPs@PVDFNPs).

Example 5

Assessment of In Vitro Antimicrobial Activity of Nanoparticles

Antibacterial activity of the prepared nanoparticles (CuNPs, PVDFNPs, and CuNPs@PVDFNPs) against two Gram-positive bacteria (*Bacillus subtilis* and *Enterococcus faecalis*) and two Gram-negative bacteria (*Salmonella enterica* and *Klebsiella pneumoniae*) were thoroughly investigated. In this work, two distinct methods were employed: the well agar diffusion experiment and the determination of the Minimum Inhibitory Concentrations (MIC), which was done in full accordance with accepted standards. The bacteria were re-cultivated in LB broth medium (agar medium), and the resulting bacterial cultures were optimally grown at about 37° C. with just moderate agitation (about 150 rpm). The bactericidal abilities of the nanoparticles were assessed using the Kirby-Bauer diffusion sensitivity test, often referred to as the well diffusion assay. In a quick explanation, sterile cork borers were used to drill about 8 mm wells in the agar medium. Then, about 100 µL of each stock solution (CuNPs, PVDFNPs, and CuNPs@PVDFNPs) for each kind of nanoparticles were individually added to the wells. After being infected, the plates were subsequently kept incubated at about 37° C. overnight. The susceptibility was assessed by carefully measuring the diametric widths of the growth inhibition zones (GIZ), which offered a tangible metric of the varied antibacterial activities.

A broth microdilution method determined the Minimum Inhibitory Concentration (MIC) values of NPs against the specific bacterial strains. The process included making various concentrations of the relevant NPs from standard solutions in sterilized LB broth (ranging from about 500 g/mL to about 50 µg/mL). The bacterial suspension was injected into the indicated tubes after being cultivated overnight to a concentration of about $1.5 \times 10^7$ CFU/mL. Then, test samples with various concentrations were added on sterile microtiter plates with wells filled with Mueller-Hinton (MH) broth. Resazurin solution (about 0.02% w/v), which was carefully added into each well of the plates after incubation at about 37° C. for a period of about 24 hours to detect any indication of microbial growth. This was used to measure the MIC for each unique nanoparticle formulation.

The bactericidal or bacteriostatic effects of the prepared NPs were further clarified by performing a time-kill kinetics study. In this work, the different bacterial strains were exposed to the corresponding nanoparticles at their Minimum Inhibitory Concentrations (MIC) throughout the mid-log phase, enabling a thorough analysis of the time-kill kinetics for the bacterial cultures. Bacterial cultures not exposed to nanoparticle treatment were maintained throughout the investigation as a reference control. A pouring-plate assay was used to count the viable cell populations, and the obtained quantifications were expressed in terms of CFU/mL.

A cell membrane damage experiment was used to determine the nanoparticles (CuNPs, PVDFNPs, and CuNPs@PVDFNPs) ability to kill bacteria by damaging cell membrane integrity. By analyzing the release of intracellular proteins from bacterial cells, the amount of membrane damage was quantified. After being grown overnight, the bacterial strains underwent for about 5 minutes centrifugation process at about 8000 rpm. The resultant cell pellet received three repeats of thorough washing with phosphate buffer saline (PBS) with a pH of about 7.4. The cell suspension was then evenly divided across several conical flasks until it reached an optical density of about 0.7 AU/cm at about 600 nm. In order to effectively combat the particular bacterial strains, the nanoparticle concentration was kept at the corresponding MIC. A set without nanoparticle exposure, to which none were introduced, was carefully preserved as the control for comparison analysis. A sterile syringe filter (about 0.2 m) was used to filter the aliquots (about 2 mL) after about 45 minutes interval. Each sample was well blended by adding about 1 mL of Bradford reagent to about 100 L of supernatant. The protein content within each sample was meticulously estimated by comparing the OD values of the samples with a previously constructed standard curve.

Example 6

Disinfection of Sewage Sample Experiment

Polluted sewage sample was taken under aseptic circumstances from a household wastewater treatment facility in Riyadh, Saudi Arabia following the APHA's recommendations. Four aquatic pathogenic bacteria (*Salmonella enterica, Klebsiella pneumoniae, Bacillus subtilis*, and *Enterococcus faecalis*) were given their viable number of cells, measured using a selective medium prior to the disinfection process using studied CuNPs@PVDFNPs at about 350 mg/mL in accordance with the manufacturer's recommendations. A water suspension containing the predetermined adequate levels of CuNPs@PVDFNPs was agitated throughout the decontamination operation. During about 5 minutes and about 120 minutes, samples of the reaction suspension were gathered at multiple points in time. Each samples' viable bacterial cell densities were quantified using a plate-counting technique by injecting about 1 mL of collected suspension into the sterile plate and pouring the molten nutrient agar. Blank control trials were carried out at the start of the experiments and at regular intervals during the course of the investigation to confirm the validity of the findings.

Example 7

Antibacterial Valuation

Figure 2A:
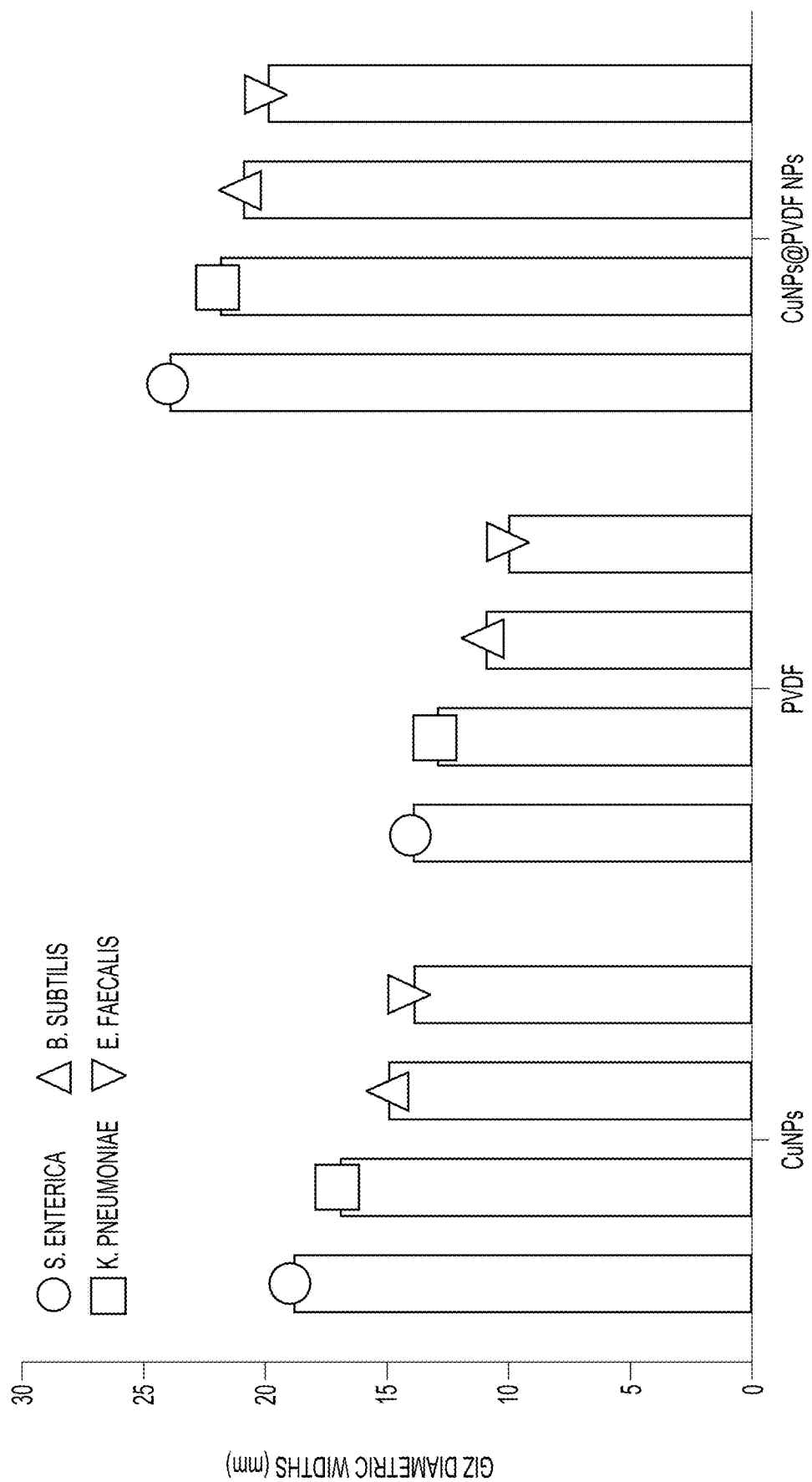
FIGS. 2A-2B depict in vitro antibacterial assays of the GIZ diametric widths (FIG. 2A) using well and minimum inhibitory concentrations (MIC) values of the NPs (CuNPs, PVDFNPs, and CuNPs@PVDFNPs) against various pathogenic bacterial strains.
Figure 2B:
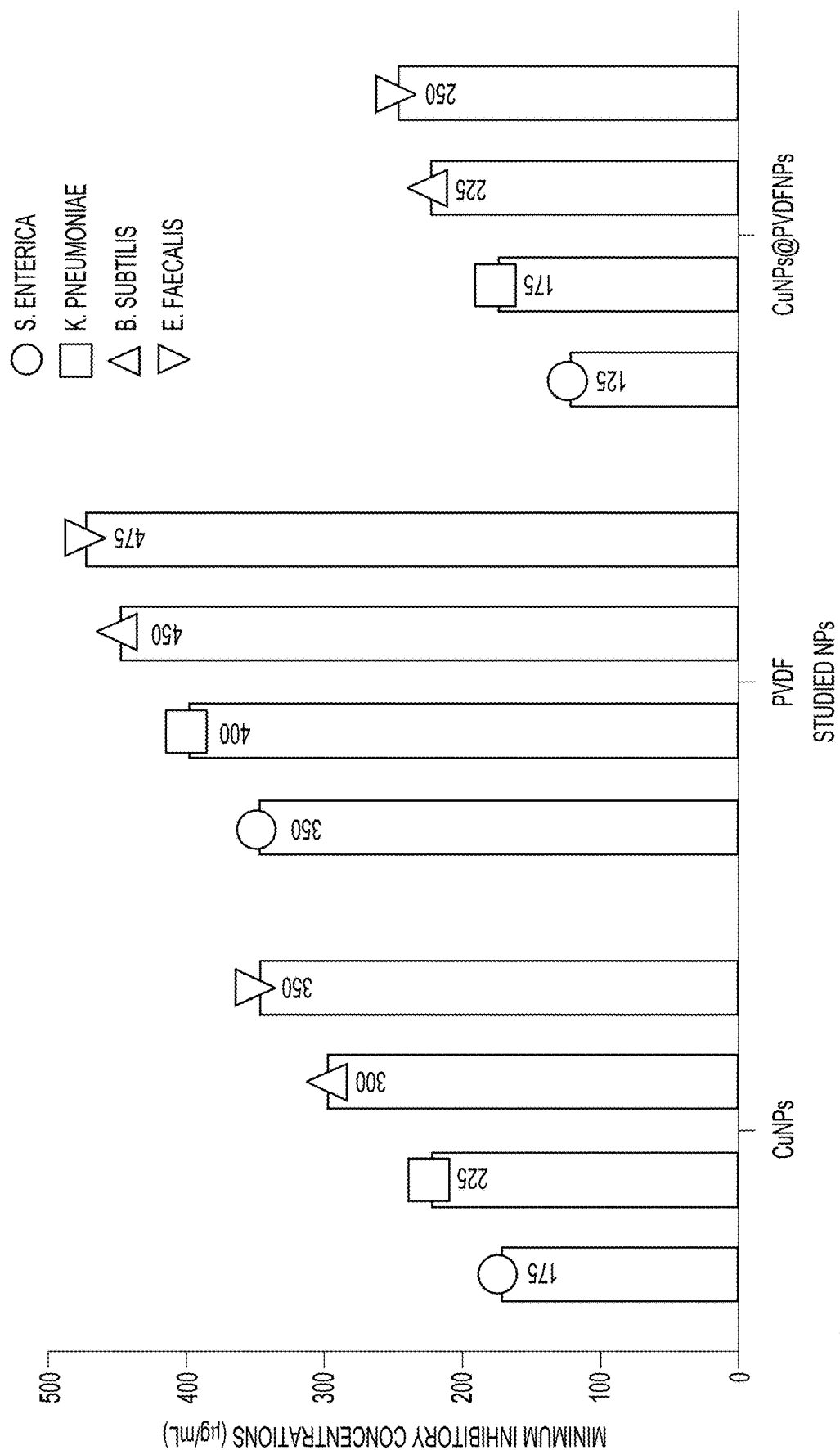

In this work, agar well diffusion and microdilution experiments were conducted to evaluate the preventive antibacterial ability of green-synthesized nanoparticles (NPs), particularly containing CuNPs, PVDFNPs, and CuNPs@PVDFNPs. Both Gram-positive (*Bacillus subtilis* and *Enterococcus faecalis*) and Gram-negative (*Salmonella enterica* and *Klebsiella pneumoniae*) bacterial strains were used to test these NPs antibacterial potency. FIGS. 2A and 2B illustrate the results of this study, which consist of measuring the zones of growth inhibition (GIZ) and calculating the minimum inhibitory concentrations (MIC) values (μg/mL). Comparative investigation showed that polyvinylidene fluoride (PVDF) alone was much less effective against all strains of bacteria than CuNPs and CuNPs@PVDFNPs (as shown in FIGS. 2A-2B). Notably, CuNPs@PVDFNPs displayed the strongest antibacterial activity against *Bacillus subtilis*, *Enterococcus faecalis*, *Salmonella enterica*, and *Klebsiella pneumoniae*. This is evident by the GIZ diametric widths of about 24 mm, about 22 mm, about 21 mm, and about 20 mm (FIG. 2A) and the MIC values of about 125 μg/mL, about 175 μg/mL, about 225 μg/mL, and about 250 μg/mL (FIG. 2B). In contrast, PVDF had somewhat lower antibacterial effects, which led to narrower GIZ diametric widths of about 14 mm, about 13 mm, about 11 mm, and about 10 mm (FIG. 2A) and higher MIC values of about 350 g/mL, about 400 g/mL, about 450 μg/mL, and about 475 μg/mL (FIG. 2B), albeit they were still statistically significant. Additionally, compared to their Gram-positive counterparts, CuNPs showed better antibacterial effectiveness against Gram-negative bacteria among the bacterial strains. CuNPs capacity to penetrate bacterial cell membranes, which results in alterations to membrane structure, led to an increase in permeability and disruption of transport mechanisms via the plasma membrane. This eventually leading to cell death, which is responsible for the differential impact.

Example 8

Time Kill

Figure 3A:
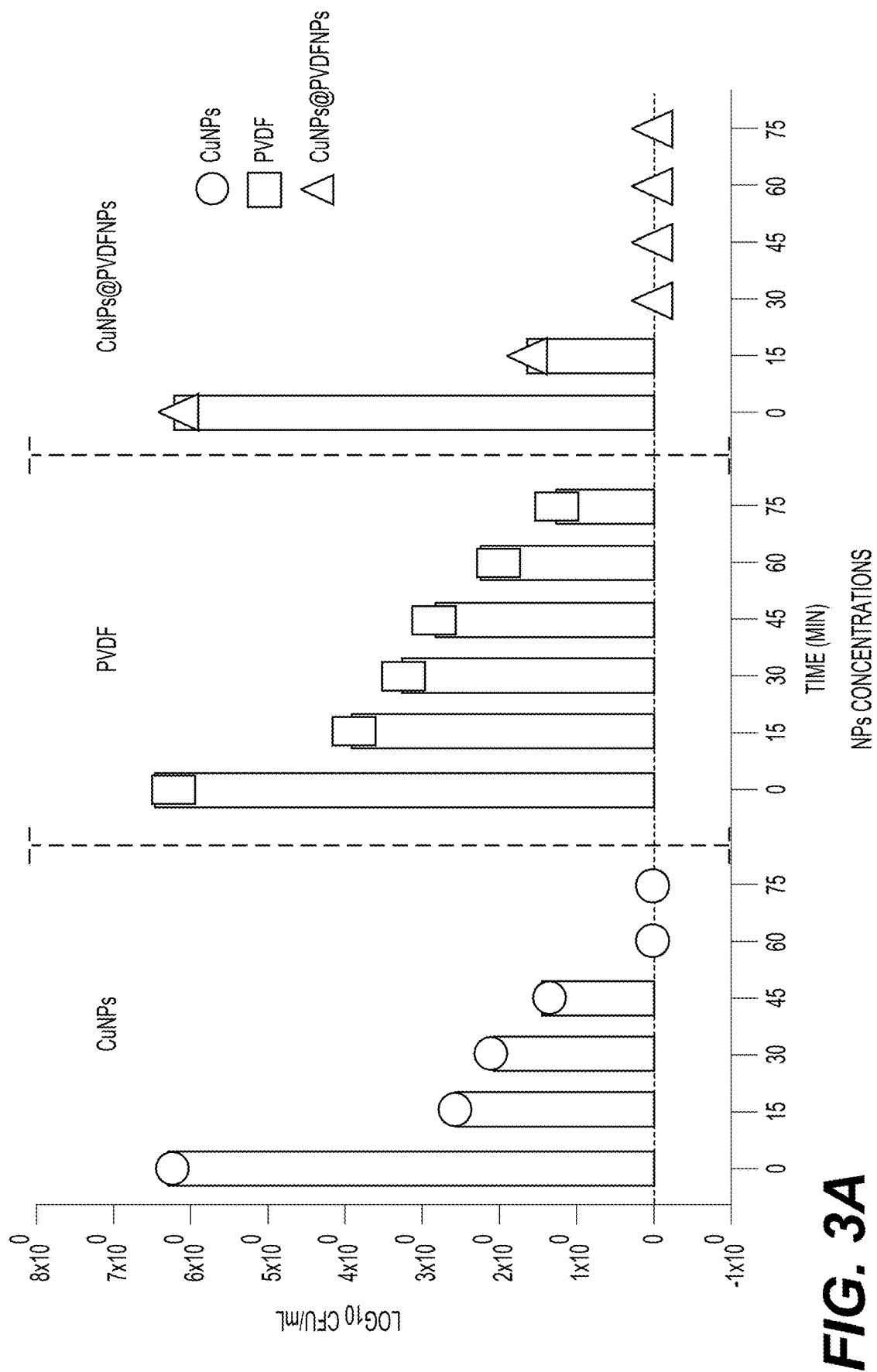
FIGS. 3A-3D depict time kill curves of the NPs (CuNPs, PVDFNPs, and CuNPs@PVDFNPs) against *Salmonella enterica* (FIG. 3A), *Klebsiella pneumoniae* (FIG. 3B), *Bacillus subtilis* (FIG. 3C), and *Enterococcus faecalis* (FIG. 3D). All data were taken in triplicate and error bars show standard deviations.
Figure 3B:
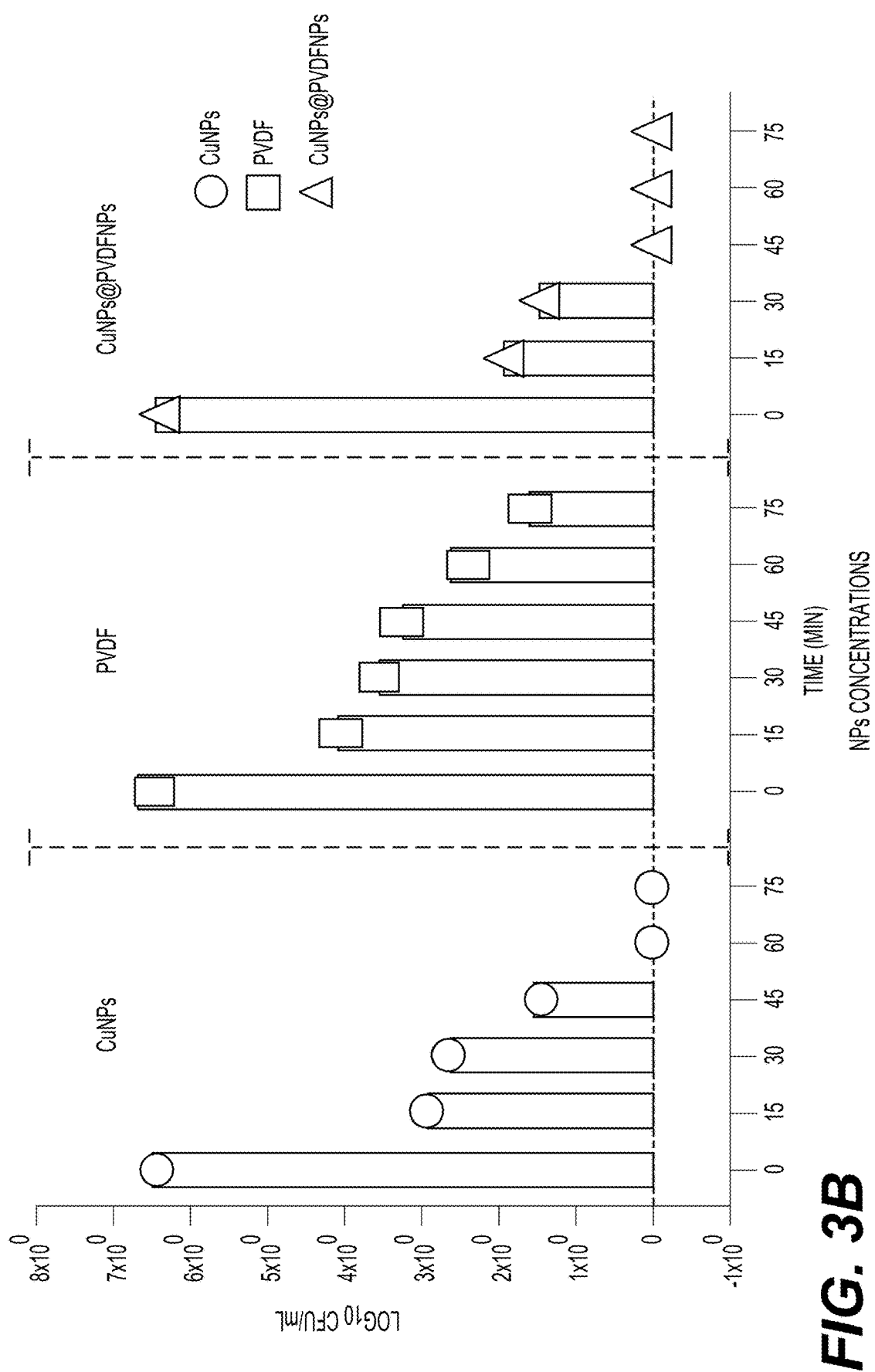
Figure 3C:
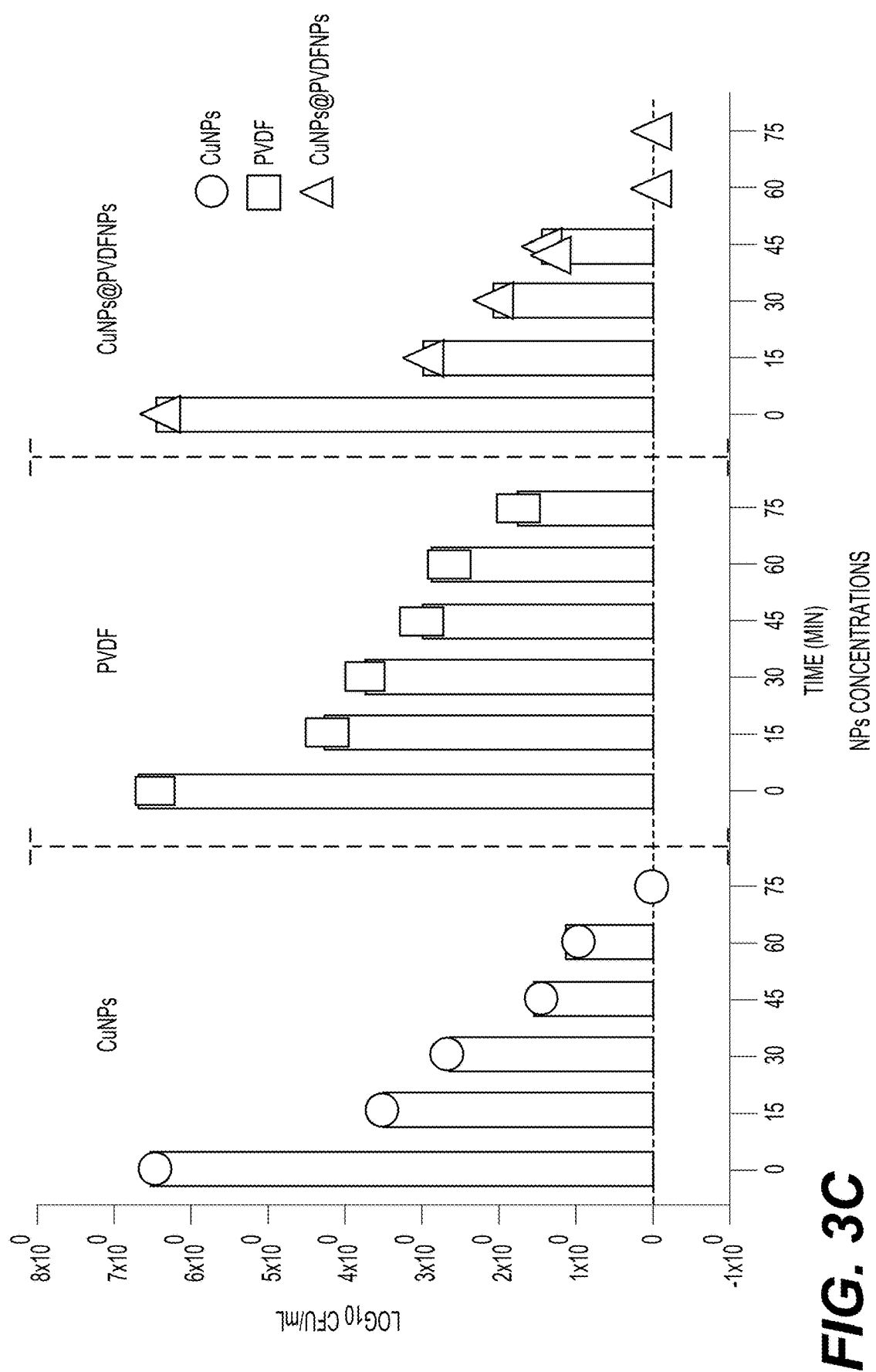
Figure 3D:
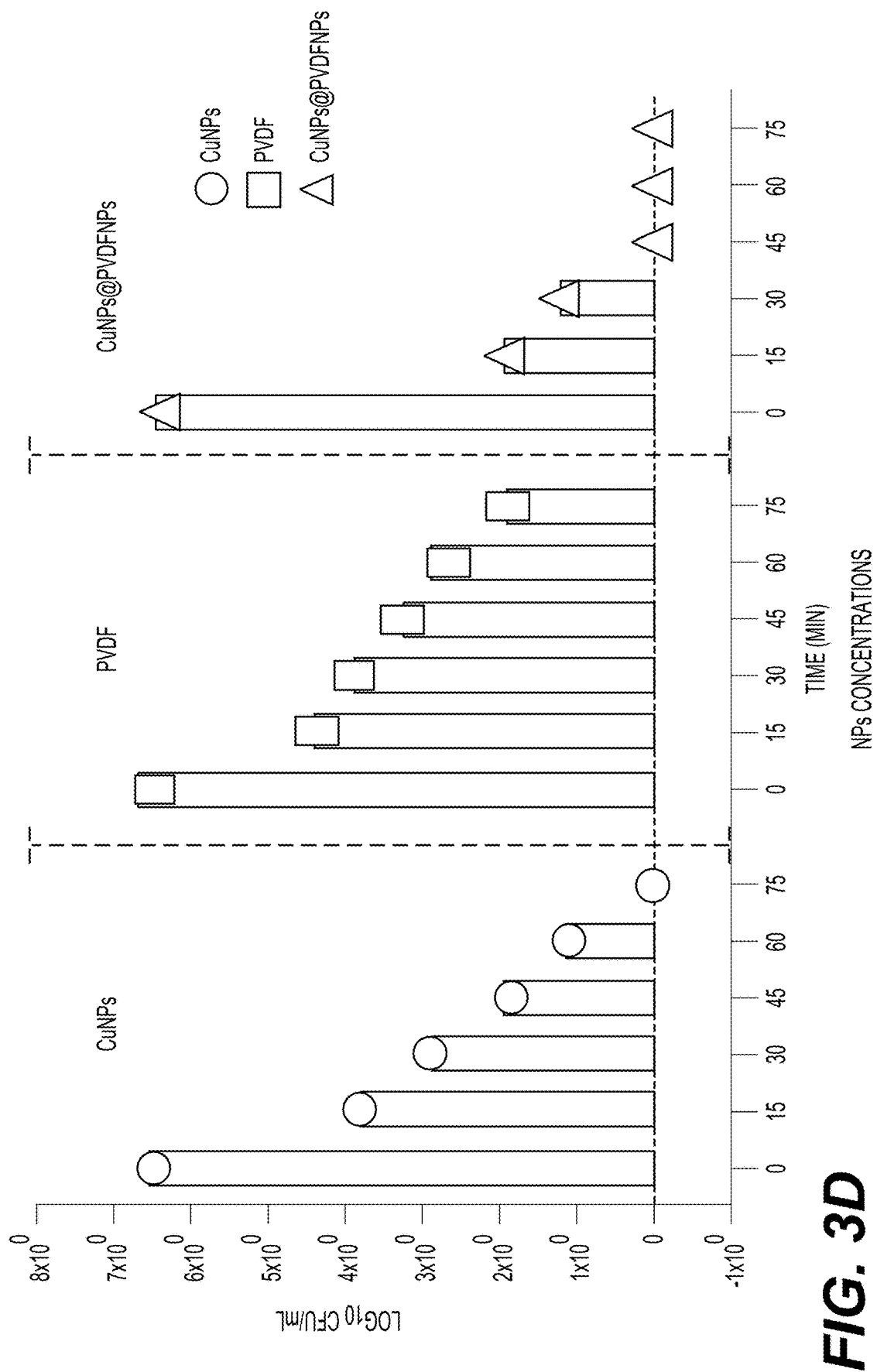
Figure 4A:
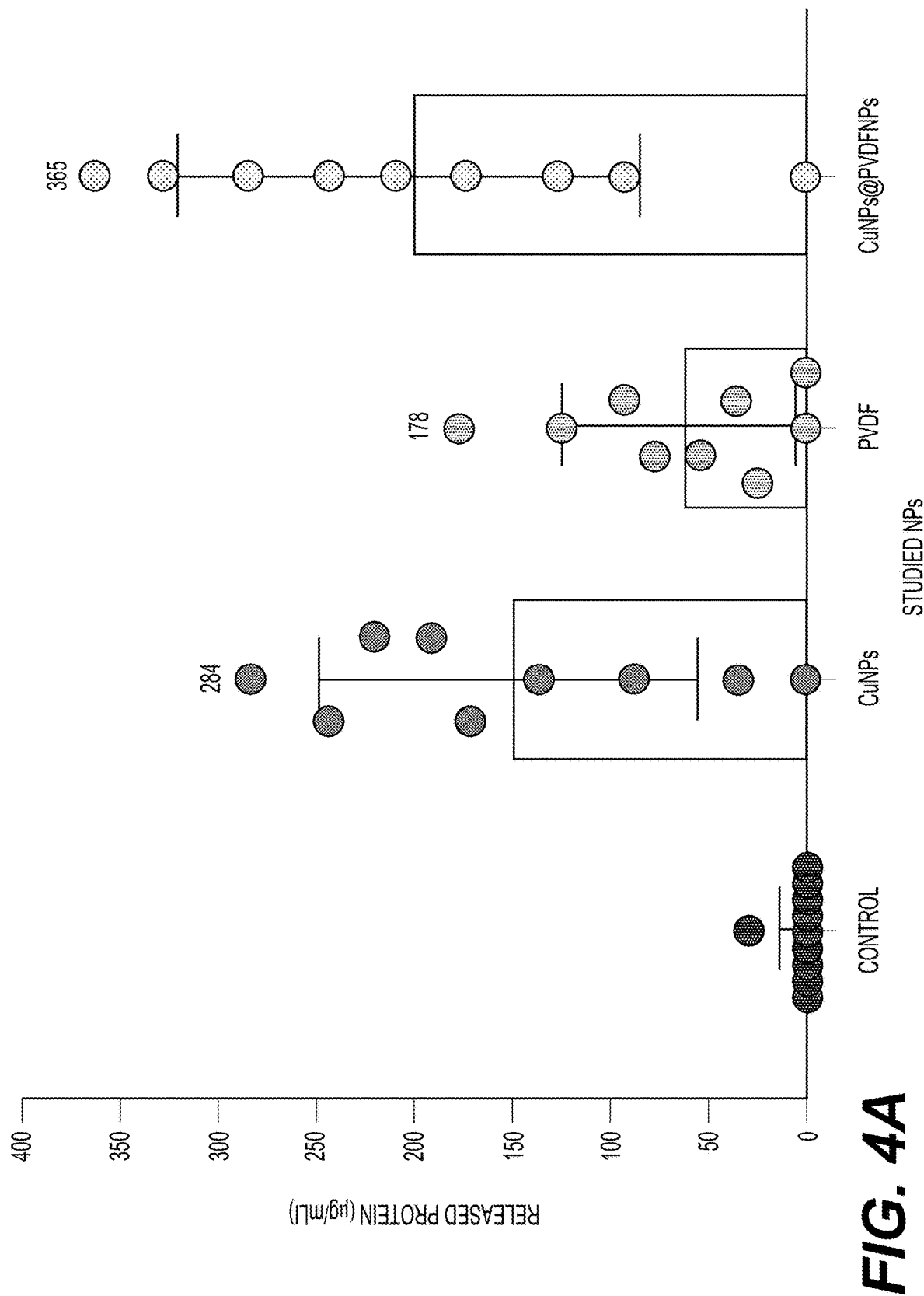
FIGS. 4A-4D depict membrane damage efficiency and amount of released intracellular protein of the NPs (CuNPs, PVDFNPs, and CuNPs@PVDFNPs) against *Salmonella enterica* (FIG. 4A), *Klebsiella pneumoniae* (FIG. 4B), *Bacillus subtilis* (FIG. 4C), and *Enterococcus faecalis* (FIG. 4D). All data were taken in triplicate and error bars show standard deviations.
Figure 4B:
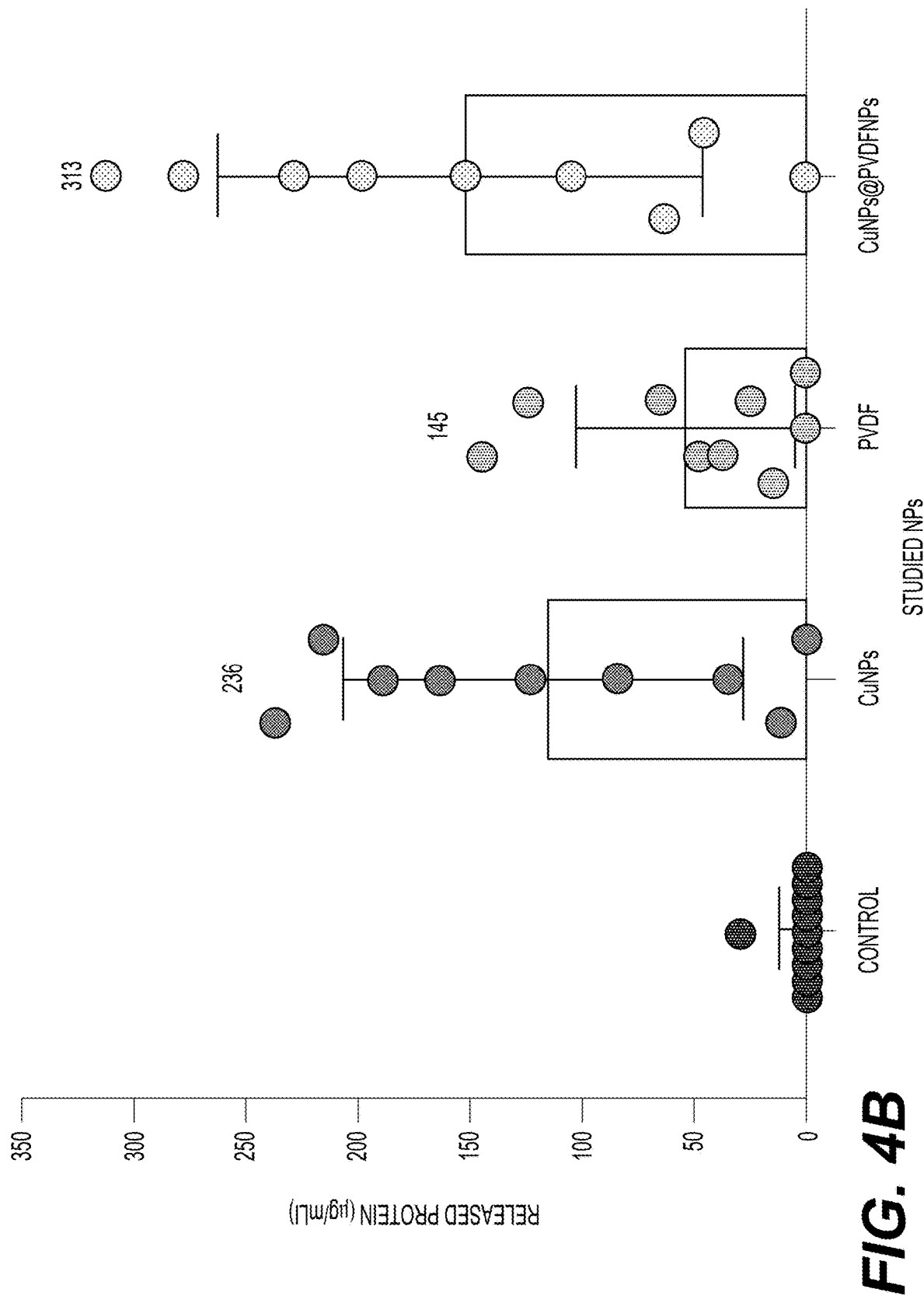
Figure 4C:
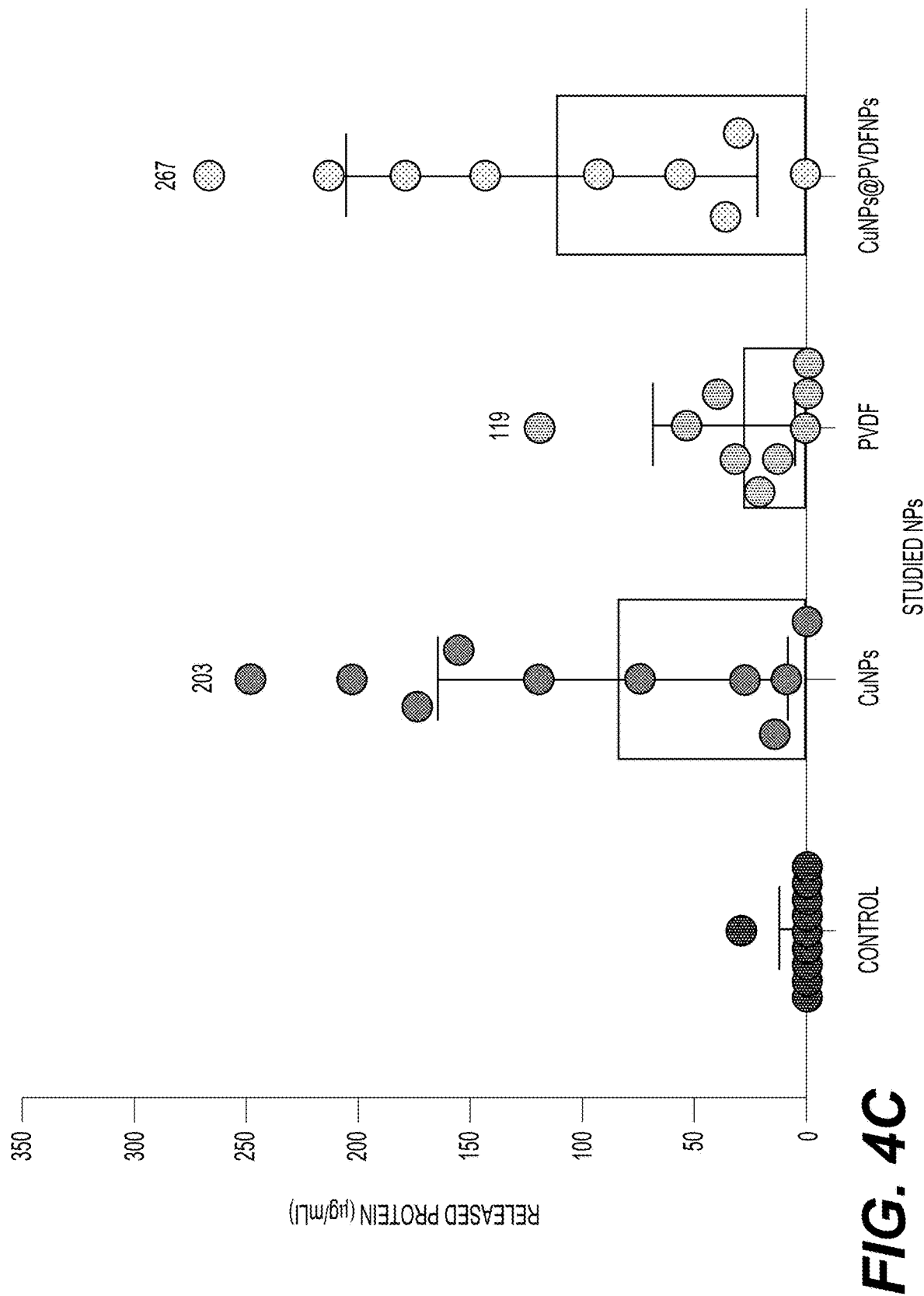
Figure 4D:
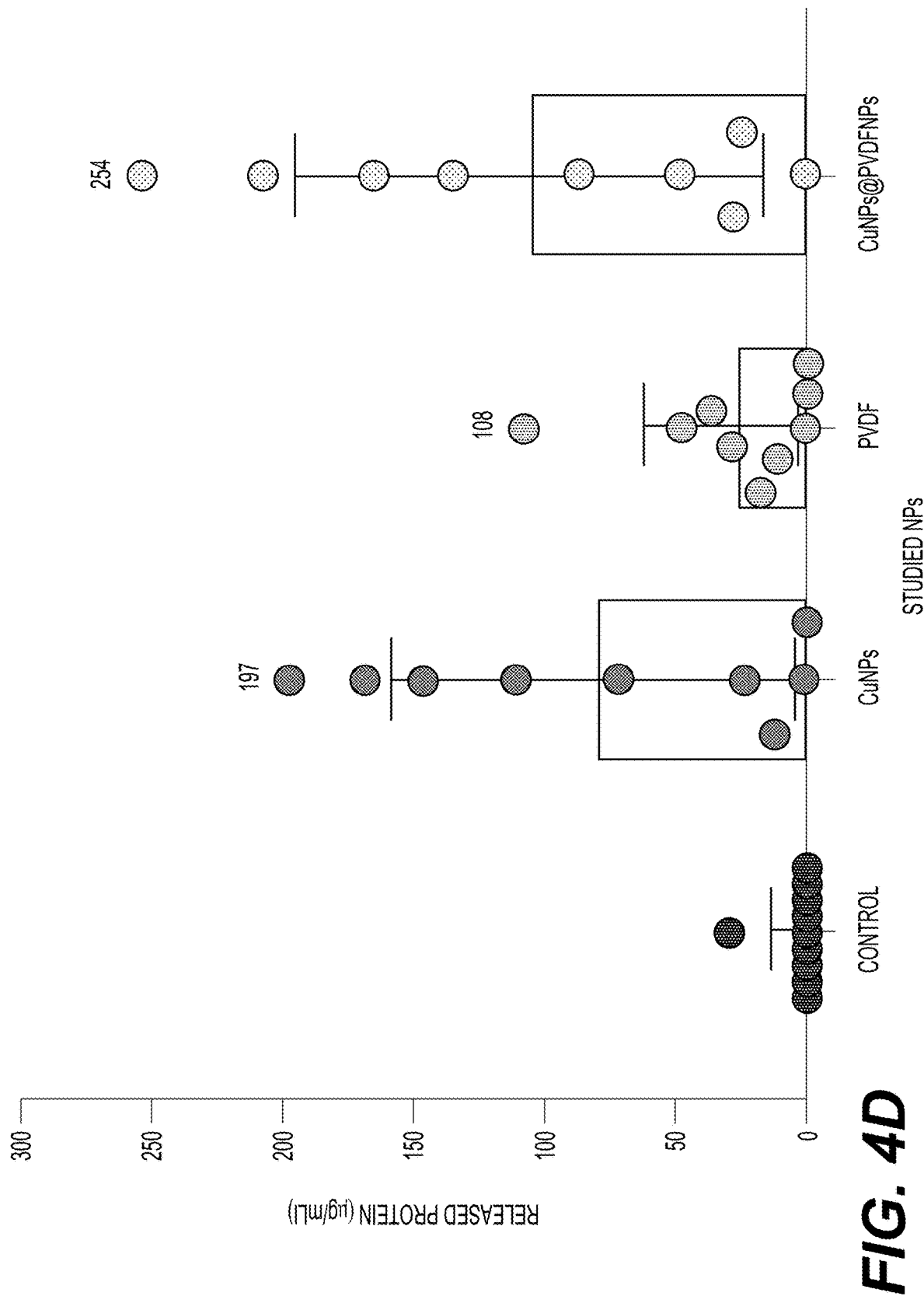

The time-kill kinetic responses registered by the bacterial strains (*Bacillus subtilis*, *Enterococcus faecalis*, *Salmonella enterica*, and *Klebsiella pneumoniae*) after exposure to NPs during various killing time (about 0 minute to about 75 minutes) are illustrated in FIGS. 3A-3D. Under CuNPs challenge, the bacterial strains time-kill kinetic responses were observed and evaluated. The results showed that CuNPs had a sizable antibacterial impact on the investigated bacterial strains. The time-kill kinetic response for *Salmonella enterica* demonstrated a progressive decline in bacterial viability over time in the presence of NPs. After about 60 minutes and about 30 minutes of exposure to CuNPs and CuNPs@PVDFNPs, the bacterial cells of *Salmonella enterica* were completely eradicated (FIG. 3A). The time-kill kinetic response for *Klebsiella pneumoniae* also showed a steady decline in bacterial viability in response to CuNPs and CuNPs@PVDFNPs treatment after about 60 minutes and about 45 minutes (FIG. 3B). As shown in FIG. 3C, the complete eradication of *Bacillus subtilis* was recorded to be about 75 minutes and about 60 minutes after exposure to CuNPs and CuNPs@PVDFNPs. The time-kill kinetic response for *Enterococcus faecalis* showed a steady decline in bacterial viability over time in the presence of NPs. Longer exposure intervals increased the antibacterial action. After about 75 minutes and about 45 minutes, the bacterial cells were completely eliminated after exposure to CuNPs and CuNPs@PVDFNPs (FIG. 3D). These findings show that CuNPs@PVDFNPs have potent antimicrobial activity against the investigated pathogens, with a range of time-kill kinetics. The prolonged contact with CuNPs@PVDFNPs gradually decreased bacterial viability and eventually resulted in eradication.

Example 9

Membrane Damage Efficiency

Membrane damage assay, especially released protein, illustrated the intensity of bacterial cell membrane disruption caused by the NPs as depicted in FIG. 4. Results indicated that CuNPs and CuNPs@PVDFNPs demonstrated significant effectiveness in damaging cell membrane integrity irrespective of the bacterial class and species. Under NPs treatment, there appeared to be a distinct treatment difference in the discharged intracellular protein in the stated order of variation in all the cases: CuNPs@PVDFNPs>CuNPs>PVDFNPs. As illustrated in FIG. 4A, the released protein quantities from *Salmonella enterica* amounted to about 284 μg/mL, about 178 μg/mL, and about 365 μg/mL upon exposure to MIC dosages of CuNPs, PVDF, and CuNPs@PVDFNPs respectively. The protein release levels from *Klebsiella pneumoniae*, as delineated in FIG. 4B, were observed to be at about 236 μg/mL, about 145 μg/mL, and about 313 μg/mL upon treatment with MIC concentrations of CuNPs, PVDF, and CuNPs@PVDFNPs respectively. Similarly, the protein release profiles of *Bacillus subtilis*, as illustrated in FIG. 4C, amounted to about 203 μg/mL, about 119 μg/mL, and about 267 μg/mL following exposure to MIC dosages of CuNPs, PVDF, and CuNPs@PVDFNPs respectively. Meanwhile, FIG. 4D shows the protein release dynamics of *Enterococcus faecalis*, with released quantities of about 197 μg/mL, about 108 μg/mL, and about 254 μg/mL, resulting from the application of MIC doses of CuNPs, PVDF, and CuNPs@PVDFNPs respectively. The antibacterial mechanism of the NPs is evident through multiple factors, primarily involving the generation of reactive oxygen species (ROS), the effective dispersion of nanoparticles (NPs) into the bacterial cell wall, and the subsequent release of ions. The notably diminutive size of these nanoparticles facilitates their penetration through the bacterial cell wall, initiating a sequence of events that culminate in the leakage of cellular components. This gradual deterioration of the cell's structural integrity ultimately leads to cell death, as depicted in FIGS. 4A-4D.

In addition, several potential processes are involved in the antibacterial action of PVDF polymer. These mechanisms include the physical breakdown of bacterial cell membranes, interference with bacterial adherence, and release of antimicrobial chemicals. The hydrophobic characteristic of PVDF, in addition to its one-of-a-kind molecular structure, is one of the surface qualities that may prevent bacteria from attaching themselves to the material. Furthermore, the surfaces of PVDF may interact with bacterial cells and damage their membranes, which can lead to bacterial cells leaking their contents and ultimately dying. PVDF materials may sometime be developed or changed in such a way as to integrate antibacterial compounds that are released over time, which further enhances the antimicrobial capabilities of the materials.

Example 10

Disinfection Experiment of Sewage Sample

Figure 5:
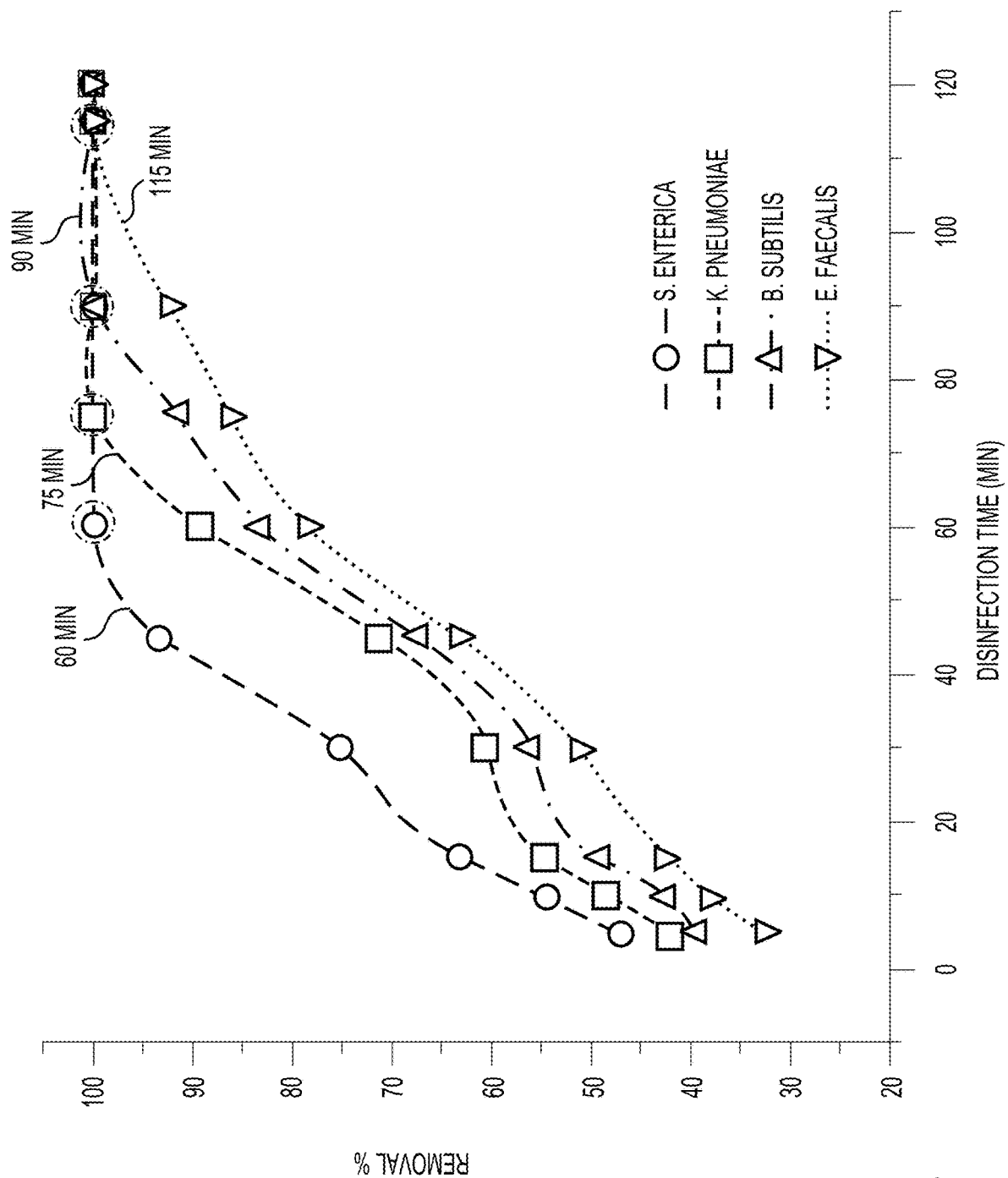
FIG. 5 is a graph showing the removal percentage of waterborne pathogenic bacteria during the disinfection process of sewage sample using the CuNPs@PVDFNPs.

CuNPs are employed in the disinfection process to eradicate or significantly decrease the presence of hazardous bacteria in a sample of pathogenic-contaminated sewage. Due to CuNPs innate antibacterial qualities and their capacity to prevent a variety of dangerous bacteria and other microbes from growing and surviving, their use in disinfection procedures has drawn interest. As shown in FIG. 5, the inactivation of waterborne pathogenic bacteria that existed in sewage samples during the disinfection process was conducted using the MIC dosage (about 350 μg/mL) of CuNPs@PVDFNPs. The findings demonstrated that the complete removal efficiency of the selected pathogens, indicated by a 100% reduction in the logarithmic count, was achieved within different time intervals. Specifically, the removal times were about 60 minutes for *Salmonella enterica*, about 75 minutes for *Klebsiella pneumoniae*, about 90 minutes for *Bacillus subtilis*, and about 115 minutes for *Enterococcus faecalis*.

The bacteria already present in a sample of pathogenic sewage react to the presence of CuNPs when these nanoparticles are added to the sample. The working mechanism is made up of many distinct actions and processes carried out in specific orders. The relatively tiny size of the CuNPs makes it more probable that they can penetrate past the cell membranes of the microorganisms. This is the first benefit. Due to this penetration, the integrity of the cell membranes is compromised, which leads to the loss of cellular components and the halting of activities necessary for the cell to function correctly. Copper ions bound up in the nanoparticles are released due to their contact with the cell membrane. This occurs due to the interaction between the nanoparticles and the membrane. Copper ions have a cytotoxic impact on the bacteria, disrupting essential cellular processes and, in the end, leading to oxidative stress. In addition, the liberated copper ions boost the capacity of the microbial cells to produce reactive oxygen species (ROS). ROS are highly reactive chemicals that can cause damage to DNA, proteins, and other components of living organisms that are important to their survival. This oxidative damage causes further impairment to the bacteria's viability and their potential for reproduction, which finally leads to the bacterium's death. The death of the bacteria is ultimately caused by oxidative damage.

It is to be understood that the methods for eliminating pathogenic contaminants from an aqueous solution, making copper nanoparticles (CUNPs), making polyvinylidene fluoride nanoparticles fine powder (PVDFNPs), and making copper nanoparticles-polyvinylidene fluoride nanoparticles nanocomposite fine powder (CuNPs@PVDFNPs) are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making copper nanoparticles (CUNPs) from spent green coffee grounds extract (SGCGs), the method comprising:
   obtaining spent green coffee grounds;
   weighing and washing the spent green coffee grounds to form washed spent green coffee grounds;
   heating the washed spent green coffee grounds to obtain dried spent green coffee grounds;
   grinding the dried spent green coffee grounds to obtain spent green coffee grounds powder;
   sieving the spent green coffee grounds powder;
   adding water to the sieved spent green coffee grounds powder to obtain a mixture;
   boiling the mixture for about 3 hours;
   cooling the boiled mixture;
   centrifuging the cooled mixture at about room temperature to form a centrifuged mixture;
   filtering the centrifuged mixture to obtain spent green coffee grounds extract;
   adding water to the spent green coffee grounds extract to obtain a spent green coffee grounds extract solution;
   stirring while heating the spent green coffee grounds extract solution;
   adding copper sulfate hexahydrate and ascorbic acid to the heated spent green coffee grounds extract solution to obtain copper nanoparticles solution;
   continuously stirring and heating the copper nanoparticles solution at about 80° C. for about 10 hours;
   separating the copper nanoparticles from the heated copper nanoparticles solution via centrifugation to obtain filtered copper nanoparticles; and
   drying the filtered copper nanoparticles to obtain dried copper nanoparticles (CUNPs).

2. The method of making copper nanoparticles from spent green coffee grounds extract of claim 1, wherein the spent green coffee grounds extract solution is magnetically stirred at about 80° C. for about 1 hour.

3. The method of making copper nanoparticles from spent green coffee grounds extract of claim 1, wherein the copper nanoparticles solution is prepared by adding dropwise of about 100 mL of the copper sulfate hexahydrate and about 0.01 g of the ascorbic acid to the heated spent green coffee grounds extract solution.

4. The method of making copper nanoparticles from spent green coffee grounds extract of claim 1, wherein the filtered copper nanoparticles are prepared by centrifuging the heated copper nanoparticles solution at a speed of about 1000 rpm for about 10 minutes.

5. The method of making copper nanoparticles from spent green coffee grounds extract of claim 1, wherein the dried copper nanoparticles are prepared by drying the filtered copper nanoparticles in a hot air oven for about 5 hours.

6. A method of making polyvinylidene fluoride nanoparticles fine powder (PVDFNPs), the method comprising:
   dissolving polyvinylidene fluoride in dimethyl acetamide (DMAc) to obtain a polyvinylidene fluoride solution;
   stirring the polyvinylidene fluoride solution;
   adding Polysorbate 80 to the polyvinylidene fluoride solution to obtain a solution mixture and stirring the solution mixture to obtain dispersed polyvinylidene fluoride nanoparticles in the solution mixture;
   separating the dispersed polyvinylidene fluoride nanoparticles from the solution mixture via centrifugation to obtain centrifuged polyvinylidene fluoride nanoparticles; and
   freeze-drying the centrifuged polyvinylidene fluoride nanoparticles to obtain freeze-dried polyvinylidene fluoride nanoparticles fine powder (PVDFNPs).

7. The method of making polyvinylidene fluoride nanoparticles fine powder of claim 6, wherein the polyvinylidene fluoride solution is prepared by dissolving the polyvinylidene fluoride in the dimethyl acetamide at a ratio of about 0.5 g of the polyvinylidene fluoride to about 50 mL of the dimethyl acetamide.

8. The method of making polyvinylidene fluoride nanoparticles fine powder of claim 6, wherein the dispersed polyvinylidene fluoride nanoparticles in the solution mixture are prepared by adding about 0.2 g of the Polysorbate 80 to the polyvinylidene fluoride solution to obtain the solution mixture and placing the solution mixture in an ice bath, then stirring the solution mixture at about room temperature for about 5 hours using an ultrasonic probe.

9. The method of making polyvinylidene fluoride nanoparticles fine powder of claim 6, wherein the freeze-dried fine powder polyvinylidene fluoride nanoparticles were prepared by freeze-drying the centrifuged polyvinylidene fluoride nanoparticles at about −60° C.

10. A method of making copper nanoparticles-polyvinylidene fluoride nanoparticles nanocomposite fine powder (CuNPs@PVDFNPs), the method comprising:
    obtaining spent green coffee grounds;
    weighing and washing the spent green coffee grounds to form washed spent green coffee grounds;
    heating the washed spent green coffee grounds to obtain dried spent green coffee grounds;
    grinding the dried spent green coffee grounds to obtain spent green coffee grounds powder;
    sieving the spent green coffee grounds powder;
    adding water to the sieved spent green coffee grounds powder to obtain a mixture;
    boiling the mixture for about 3 hours;
    cooling the boiled mixture;
    centrifuging the cooled mixture at about room temperature to form a centrifuged mixture;
    filtering the centrifuged mixture to obtain spent green coffee grounds extract;
    adding water to the spent green coffee grounds extract to obtain a spent green coffee grounds extract solution;
    stirring while heating the spent green coffee grounds extract solution;
    adding copper sulfate hexahydrate and ascorbic acid to the heated spent green coffee grounds extract solution to obtain copper nanoparticles solution;
    continuously stirring and heating the copper nanoparticles solution at about 80° C. for about 10 hours;
    separating the copper nanoparticles from the heated copper nanoparticles solution via centrifugation to obtain filtered copper nanoparticles;
    drying the filtered copper nanoparticles to obtain dried copper nanoparticles (CUNPs);
    dispersing the dried copper nanoparticles in deionized water to obtain a solution mixture and stirring the solution mixture to obtain a copper nanoparticles solution mixture;
    dissolving polyvinylidene fluoride in dimethyl acetamide (DMAc) to obtain a polyvinylidene fluoride solution;
    stirring the polyvinylidene fluoride solution;
    adding Polysorbate 80 to the polyvinylidene fluoride solution to obtain a solution mixture and stirring the solution mixture to obtain dispersed polyvinylidene fluoride nanoparticles in the solution mixture;
    separating the dispersed polyvinylidene fluoride nanoparticles from the solution mixture via centrifugation to obtain centrifuged polyvinylidene fluoride nanoparticles;
    freeze-drying the centrifuged polyvinylidene fluoride nanoparticles to obtain freeze-dried polyvinylidene fluoride nanoparticles fine powder (PVDFNPs);
    preparing a mixture of deionized water and Polysorbate 80 to obtain a solution;
    dispersing the freeze-dried polyvinylidene fluoride nanoparticles fine powder in the solution to obtain a polyvinylidene fluoride nanoparticles solution;
    continuously stirring the polyvinylidene fluoride nanoparticles solution while adding the copper nanoparticles solution mixture to the polyvinylidene fluoride nanoparticles solution to obtain a copper nanoparticles-polyvinylidene fluoride nanoparticles nanocomposite solution; and
    freeze-drying the copper nanoparticles-polyvinylidene fluoride nanoparticles nanocomposite solution to obtain a freeze-dried copper nanoparticles-polyvinylidene fluoride nanoparticles nanocomposite fine powder (CuNPs@PVDFNPs).

11. The method of making copper nanoparticles-polyvinylidene fluoride nanoparticles nanocomposite fine powder of claim 10, wherein the copper nanoparticles solution mixture is prepared by dispersing about 0.25 g of the dried copper nanoparticles in about 10 mL of the deionized water to obtain the solution mixture and stirring the solution mixture for about 2 minutes using a magnetic stirrer.

12. The method of making copper nanoparticles-polyvinylidene fluoride nanoparticles nanocomposite fine powder of claim 10, wherein the solution is prepared by adding the deionized water to the Polysorbate 80 at a ratio of about 50 mL of the deionized water to about 0.1 g of the Polysorbate 80.

13. The method of making copper nanoparticles-polyvinylidene fluoride nanoparticles nanocomposite fine powder of claim 10, wherein the obtained copper nanoparticles-polyvinylidene fluoride nanoparticles nanocomposite solution comprises complete homogeneity between the copper nanoparticles and the polyvinylidene fluoride nanoparticles.

14. The method of making copper nanoparticle-polyvinylidene fluoride nanoparticle nanocomposite fine powder of claim 10, wherein the copper nanoparticles-polyvinylidene fluoride nanoparticles nanocomposite solution is prepared by continuously stirring the polyvinylidene fluoride nanoparticles solution for about 30 minutes using an ultrasonic probe while adding about 5 mL of the copper nanoparticles solution mixture to the polyvinylidene fluoride nanoparticles solution.

15. The method of claim 10, and further comprising eliminating pathogenic contaminants from an aqueous solution by disinfecting the aqueous solution with the copper nanoparticles-polyvinylidene fluoride nanoparticles nanocomposite fine powder (CuNPs@PVDFNPs).

16. The method of claim 15, wherein the aqueous solution comprises wastewater.

17. The method of claim 15, wherein the pathogenic contaminants are selected from the group consisting of *Salmonella enterica, Klebsiella pneumoniae, Bacillus subtilis, Enterococcus faecalis*, other bacteria, and combination thereof.

* * * * *